3,644,588
BLOCK POLYMER HYDROGENATION PROCESS
Howard L. Hassell, San Leandro, Calif., assignor to
Shell Oil Company, New York, N.Y.
No Drawing. Filed Sept. 17, 1969, Ser. No. 858,894
Int. Cl. C08f 15/04, 27/24
U.S. Cl. 260—879
6 Claims

ABSTRACT OF THE DISCLOSURE

Block copolymers of conjugated dienes and monovinyl arenes may be substantially completely hydrogenated by a two-stage process, the first stage under mild conditions to hydrogenate the diene blocks, the second stage at more strigent conditions to hydrogenate the monovinyl arene blocks, the latter stage being conducted in the presence of certain catalyst modifiers such as alcohols.

---

This invention is concerned with an improved process for the hydrogenation of block copolymers. More particularly, it is directed to a process for hydrogenation of block copolymers without encountering polymer degradation.

The development of block copolymers formed between conjugated diene and monovinyl arenes has received considerable attention during recent years. For some reason as yet underdetermined, they have been found to be especially sensitive to thermal degradation and more particularly to oxidative degradation at elevated temperatures. Consequently, there was a desire and need for an efficient and economic process for stabilization of the block polymers, the most readily available process being one of hydrogenation. Several problems were encountered in devising such a process. In the first place, it was necessary to find the type of catalyst which was most promising for hydrogenation of such block copolymers, keeping in mind that two different types of double bonds must be considered, namely, aromatic double bonds and aliphatic double bonds. Catalysts which can hydrogenate aliphatic double bonds at relatively low temperatures may be employed since such double bonds seem especially amenable to reduction. However, certain difficulties were encountered in devising catalysts which would fully hydrogenate the aromatic double bonds.

In addition to the search for suitable catalyst, it was also necessary to overcome certain disadvantages which are usually associated with hydrogenation processes. These comprise the degradation of the polymer chains which was found to occur under conditions usually necessary for rapid hydrogenation. The block polymers represent a unique situation in which polymer degradation is catastrophic rather than merely statistical. Particularly when the block copolymers have the general configuration A—B—A or more elaborate formulations based thereon as more fully described hereinafter. The scission of polymer chains of this type virtually ruins the desired physical properties of such polymers. This is due to the fact that the configuration A—B—A, wherein each A is a monovinyl arene block and B represents a conjugated diene polymer block, have unique physical properties resulting in their being referred to as "thermoplastic elastomers" when the molecular weight relationships are within certain ranges. In an ordinary polymer such as polyisoprene, for example, chain scission merely reduces the average molecular weight to a certain extent. However, when chain scission of the A—B—A type of block copolymer occurs not only is the molecular weight reduced but the thermoplastic elastomeric properties of the polymer are actually destroyed, since scission causes formation of two-block or single block polymers. Consequently, it was necessary to devise a means by which the block copolymers could be efficiently hydrogenated, i.e., at a rapid rate in both types of polymer blocks without encountering catastrophic chain scission or degradation.

It is an object of the present invention to provide an improved process for the hydrogenation of block copolymers. It is a particular object of the present invention to provide a process for efficient and rapid hydrogenation of block copolymers. Especially, it is an object of this invention to provide a hydrogenation process which will permit hydrogenation of both types of polymer blocks without resulting in catastrophic degradation of the polymer chains. Other objects will become apparent during the following detailed description of the invention.

Now, in accordance with the present invention, a hydrogenation process achieving the above objectives is provided wherein the block copolymers are hydrogenated in the presence of a catalyst consisting essentially of the reaction product of an aluminum alkyl compound and a transition metal salt, the features of the process in accomplishing the aims and objectives announced above being the following: Hydrogenating the block copolymer at temperatures below about 125° C. (preferably below about 100° C.) e.g. 30–60° C. and at hydrogenation pressures below about 1,000 p.s.i.g. e.g. 600–800 p.s.i.g. in the substantial absence of catalyst modifiers; conducting the hydrogenation until at least about 90% of the aliphatic unsaturation is reduced and no more than a minor amount of aromatic unsaturation has been reduced; adding to the hydrogenation reaction mixture a catalyst modifier preferably of the group consisting of Lewis bases, weak organic acids, alcohols, amines, and oxygen; and continuing hydrogenation at temperatures between about 100° C. and 250° C. preferably 175–225° C. under at least 1,000 p.s.i.g. preferably 1100–2000 p.s.i.g. hydrogen pressure and until at least about 40% (preferably at least 75%) of the aromatic unsaturation has been reduced. Under these conditions it has been found that the aliphatic unsaturation is at least 90% reduced by hydrogenation and the aromatic unsaturation is reduced at least 40%, while at the same time chain degradation is at a minimum and reaction rate is at a maximum in both stages of the polymerization.

The block copolymers especially contemplated for hydrogenation according to the process of this invention have at least two polymer blocks A and B and preferably at least three polymer blocks arranged A—B—A, although the generic aspect of the invention contemplates any block polymer arrangement of A and B, typified particularly by linear configurations including $A(B—A)_n$ and A—B—(B—A)$_n$, the latter configuration allowing for the formation of branched polymer chains. In the above configurations, it is especially contemplated that A represents a monovinyl arene polymer block or one predominating in monovinyl arene units while B represents a conjugated diene polymer block or a block predominating in polymerized conjugated diene units. However, the present process is not confined to block polymers wherein the blocks A and B are as noted above, but also contemplates the reverse order of the blocks, namely, where the blocks A may predominate in polymerized conjugated diene units and the blocks B may predominate in polymerized monovinyl arene units. The most simple form of the invention therefore will use a polymer having the simple configuration polystyrene-polyisoprene or polystyrene-polybutadiene as well as poly(alpha methyl styrene)-polybutadiene. More preferably, however, the most useful type of block polymer has more than two polymer blocks in the general configurations noted above wherein the subscript n usually represents integer between 1 and 5. Thus for convenience in discussing the present invention the basic three-block copolymer will be generally referred to. The typical species of the three-block copolymer are polystyrene-polyisoprene-polystyrene and polystyrene-polybutadiene-polystyrene. In place of the individual diene species, mixtures of these species may be utilized and in place of styrene, alpha methyl styrene may be used or mixtures thereof with styrene. Moreover, as suggested above, the individual blocks A and B may comprise random copolymer blocks of dienes and monovinyl arenes such as random copolymer blocks of styrene with butadiene.

It is known in the literature how to form block copolymers of these several types. Generally, two processes or combinations thereof are especially favored. The first of these may be referred to as a sequential process in which the polymer blocks are formed sequentially by sequential addition of the polymerizable monomers. A more controllable process relative to individual block molecular weights has been devised in which coupling are utilized usually in conjunction with a preceding pair of sequential block formation steps. A wide variety of coupling agents are utilized for this purpose and normally contemplate the coupling of living polymer chains, namely, polymer chains bearing an alkali metal, e.g., lithium ion at one or both ends of the chain. The present process appears to be especially applicable with respect to depression of potential chain scission when coupled block copolymers are involved in hydrogenation. However, the virtues of the present process relative to rate are also observed when a sequentially produced block polymer is to be hydrogenated.

While the coupling agents may comprise polyvinyl arenes such as divinyl benzene and the like or polyhaloalkenes are alkanes such as dichloroethane or dibromobutane, the especially favored class of couplingg agents comprises esters of carboxylic acids. These may be monoesters, diesters, or esters of a more complicated type and it has been found especially that the ester coupled block copolymers appear to be particularly prone to degradation under hydrogenation conditions. Consequently, the benefits of the present invention are particularly noteworthy when it is applied to the hydrogenation of such ester coupled block copolymers.

The diesters which are preferred for coupling block copolymers are those in which the carboxyl radicals of the acid from which the ester is made are directly attached to a carbon atom. Preferably the two carboxyls are connected by carbon-to-carbon bonds only and no carbon-to-oxygen bonds are present in the connecting links. Moreover, it is preferred that this diester be one formed between dibasic carboxylic acid and a monohydric alcohol. The following list of aliphatic acids illustrates the dicarboxylic acids which may be used for the formation of suitable esters.

Aliphatic acids

| | |
|---|---|
| Oxalic | Maleic |
| Malonic | Fumaric |
| Succinic | Glutaric |
| Adipic | Pimelic |
| Suberic | Sebacic |
| Itaconic | |

The following list of aromatic acids illustrate the type of dicarboxylic acids which may be employed for forming suitable esters:

Aromatic acids

| | |
|---|---|
| Pthalic | Isophthalic |
| Terephthalic | Naphthalic |
| Diphenic | |

Esters of the above types of dicarboxylic acids may be formed from either aliphatic or aromatic monohydric alcohols of which the following are typical:

Monohydric alcohols

| | |
|---|---|
| Methyl | Ethyl |
| n-Propyl | Isopropyl |
| n-Butyl | sec-Butyl |
| tert. Butyl | Amyl |
| Hexyl | Octyl |
| Phenol | Cresol |

The esters may bear alkyl or aryl substituents without altering the nature of the present invention. The following esters are typical of those prepared from the above types of acids and esters:

Esters

| | |
|---|---|
| Dimethyl oxalate | Diethyl oxalate |
| Dipropyl malonate | Dibutyl glutarate |
| Dihexyl pimelate | Dimethyl adipate |
| Diethyl adipate | Dioctyl sebacate |
| Dimethyl phthalate | Diethyl terephthalate |

In addition to the use of such diesters, which results in production of what is believed to be branched polymer chains by the use of monoesters.

These may be formed from monobasic acids such as fatty acids, hydroxy monobasic acids, unsaturated acids together with esterifying monohydric alcohols such as fatty alcohols or unsaturated alcohols. The following list typify these acids as well as esters which may be employed.

Fatty acids

| | |
|---|---|
| Acetic | Pivalic |
| Propionic | Valeric |
| Butyric | Caproic |
| Formic | |

Fatty alcohols

| | |
|---|---|
| Methanol | Phenol |
| Ethanol | Isopropanol |
| Propanol | Cresol |
| Butanol | Octanol |
| Pentanol | Hexanol |

Unsaturated alcohols

| | |
|---|---|
| Allyl | Methallyl |

Hydroxymonobasic acids

| | |
|---|---|
| Lactic | Glycollic |

Unsaturated acids

| | |
|---|---|
| Acrylic | Angelic |
| Methacrylic | Benzoic |
| Isocrotonic | |

Esters

| | |
|---|---|
| Methyl acetate | Butyl acrylate |
| Ethyl acetate | Ethyl acrylate |
| Propyl acetate | Butyl methacrylate |
| Methyl formate | Allyl butyrate |
| Ethyl formate | Amyl butyrate |
| Amyl acetate | Amy caproate |
| Vinyl acetate | |

Other types of monofunctional compounds which may be used in place of or in addition to the preferred monoesters include metallic salts of above acids, nitriles, amides, ketones, isothiocyanates, acetylenes and isocyanates. Typical species of such agents include benzonitrile, methyl isocyanate, phenyl isocyanate, acetylene, etc.

While the preparation of the block copolymers per se does not form a part of the present invention, a brief reference to a typical coupling process may be in order. Lithium based catalysts are preferred for this purpose and particularly lithium alkyl such as a lithium butyl. Inert solvents and inert atmospheres are utilized, solvents such as cyclohexane or isoamylenes or mixtures thereof being employed. For example, styrene may be polymerized initially in the presence of the lithium alkyl initiator to form a first polystyrene block which bears a lithium ion at the growing end of the polymer chain. After a desired molecular weight is achieved a conjugated diene such as polyisoprene is injected. Polymerization is continued, to form an intermediate block polymer having the structure polystyrene-polyisoprene-Li. At this point coupling may be utilized by the injection of a suitable coupling agent such as diethyl adipate. This causes the formation of coupled polymers which may be represented without specific reference to the coupling agent residue. Although it is believed that certain portions of the coupling agent such as an oxygen containing radical may be present at the point of coupling.

The present invention is especially directed to the use of a particular class or classes of hydrogenation catalysts. These have been selected because of their efficiency with respect to rate and yield as well as with respect to their capability of causing hydrogenation of both conjugated diene polymer blocks and monovinyl arene polymer blocks. Two types of reaction products are especially contemplated for use as catalysts. These comprise the reaction products of aluminum alkyl compounds with cobalt and nickel carboxylates and halides or with nickel or cobalt alkoxides, both generically referred to in this specification as cobalt or nickel salts.

The cobalt or nickel compound is a carboxylate of the metal wherein at least one of the carboxyl radicals has from 1 to 12 carbon atoms. The reduced compositions may be prepared and used as hydrogenation catalysts in situ or may be prepared separate from and prior to use. Ordinary moderate amounts of heat are employed to effect reduction of the metal compounds although heating is not required. For convenience, temperatures of from 0° C. to 250° C. may be employed, although temperatures from about room temperature to 200° C. are especially suitable.

The ratio of organometallic reducing agents to cobalt or nickel carboxylates may vary widely since even a partial reduction results in the production of an active hydrogenation catalyst. Molar ratios of the aluminum alkyl compound to carboxylate between 0.1:1 to 30:1 (preferably 0.5:1 to 10:1) may be used. It is preferred that the reducing agent utilized in the preparation of the catalyst is a halogen free aluminum alkyl compound, preferably an aluminum trialkyl but also include in aluminum alkyl hydrides. Preferably the alkyl radicals contain from 1 to 10 carbon atoms in at least one alkyl radical such as methyl, ethyl, propyl, butyl, pentyl, hexyl, octyl, nonyl, or decyl. Trialkyl aluminum reducing agents are especially preferred.

The cobalt carboxylates utilized in the formation of the catalyst and their nickel counterparts are to be carboxylates wherein at least one carboxyl radical has from 1 to 12 (preferably 2–9) carbon atoms. The preferred species include nickel or cobalt acetates and octoates or halides. Mixtures of carboxylates or of aluminum alkyls may be utilized. The catalyst may be either homogeneous in slurry form or supported. The slurry formed catalyst may be easily prepared by contacting the metal compound in an anhydrous solvent with the aluminum alkyl in a dry inert or hydrogen atmosphere. When this procedure is followed, the solution turns black, heat is evolved and a black deposit forms.

Suitable alkoxides which may be used in place of or in addition to the cobalt or nickel carboxylates include the cobalt or nickel butoxides, ethoxides, amyloxides, and isopropoxides. It is preferred, however, that the alkoxide be an acetyl acetonate or mixtures thereof with one of the simple alkoxides or with a carboxylate.

The first stage of the hydrogenation comprises hydrogenating the block copolymer in an inert solution under relatively mild condiitons and in the substantial absence of any catalyst modifier. The conditions employed comprise hydrogenation at temperatures between about 0° C. and 100° C. and preferably at hydrogenation pressures below about 1,000 p.s.i.g., usually below 800 p.s.i.g. for a time sufficient to reduce at least 90% of the original aliphatic unsaturation. While causing no more than a minor amount of reduction of aromatic unsaturation. At this point hydrogenation is preferably stopped for a time sufficient to add to the hydrogenation reaction mixture a catalyst modifier. This may be a Lewis base, a weak organic acid material, or oxygen.

The amount of modifier added depends on the amount of reducing agent utilized in preparing the catalyst system. Generally, enough modifier should be added so as to result in at least a stoichiometric ratio of modifier to reducing agent. It is normally preferred, however, to utilize a slight excess of modifier component, and molar ratios of modifier, and molar ratios of third component to organo-aluminum reducing agent preferably ranges from about 1:1 to 10:1, more preferably between 1.5:1 and 2.5:1. In cases where the third component is relatively expensive, only enough should be added, i.e., at least stoichiometric ratios, to give the advantageous results of this invention. Normally, the modifier is added after the contacting of the organoaluminum compound and the transition metal salt, except as noted hereinafter.

Of the third components that may be utilized in the process of this invention, Lewis bases make up a preferred class. Lewis bases are generally defined as substances that can furnish an electron pair to form a co-valent bond, i.e., an electron pair donor. Lewis bases are also excellent solvents and/or co-solvents for preparing the catalyst and may be used as such. Furthermore, Lewis bases impart an additional activity to the modified Ziegler type catalyst systems described herein. This increased activity is particularly noticeable when cobalt compounds are employed as the transition metal compound for preparing the soluble catalyst system. Preferred Lewis bases are the mono- and di-functional ethers, e.g., dioxane, tetrahydrofuran 1,2-dimethoxyethane, anisole, diethylether, diisopropyl ether, diphenyl ether, methylethyl ether, diglyme, isopropylphenyl ether, etc. and tertiary amines, preferably having 1 to about 10 carbon atoms, e.g., triethylamine, tripropylamine, tributylamine, and its homologous series, N-methylmorpholine, quinoline, tetrahydroquinoline, and the like; the ethers being particularly preferred.

It has been found in accordance with this invention, the Lewis base may be added to the organoaluminum reducing agent in at least a stoichiometric amount prior to the mixing of the reducing agent with the transition metal compound. This leads to the formation of a Lewis base-organoaluminum complex such as an etherate, which has different alkylation power than the AlR$_3$ reducing agent and which is not a catalyst poison. Reductions using a Lewis base-organoaluminum complex lead to catalysts with superior properties, e.g., higher hydrogenation activity. This effect upon catalyst activity in hydrogenations is quite surprising in view of some recently published literature on Ziegler type catalysts which describes such procedures as being detrimental to the resulting polymerization system. However, not only is this procedure not detrimental but it is also extremely advantageous in certain instances, e.g., the use of cobalt compounds to be reduced by an etherate in the preparation of highly active hydrogenation catalysts.

Another type of third component which may be added advantageously to the Ziegler type catalyst systems is a weak organic acid. Such materials are generally characterized as having weakly ionizable hydrogen atoms. Included among these are primary, secondary, and tertiary alcohols and primary and secondary amines having from 2 to about 20 carbon atoms, and preferably 1 to about 10 carbon atoms. Particularly preferred compounds are the tertiary alcohols in the above-mentioned carbon atom ranges, e.g., tert. butyl alcohol. Illustrative of the weak acids that may be employed are: methanol, hexanol, 2-ethyl hexanol, cyclohexanol, sec. butanol, n-butanol, octanol, cyclododecanol, glycols, and the like.

After addition of the modifier to the hydrogenation reaction mixture, hydrogenation is resumed under more stringent conditions comprising temperatures between about 100–250° C. and preferably but under not necessarily increased hydrogen pressures, e.g., at least 1,000 p.s.i.g., preferably 1,000–5,000 p.s.i.g. until at least about 75% of the aromatic unsaturation has been reduced. The two stages of hydrogenation may vary in time from only a few minutes to several hours or more, although periods of ten minutes to 90 minutes are especially contemplated.

Following the end of the hydrogenation period, it is preferred for most purposes that the catalyst residues be removed such as by precipitation, filtration, or other means. The hydrogenation mixture is then treated to recover the polymer such as by flashing off the solvent or coagulating the polymer with steam and/or hot water.

It has been found in accordance with the present invention that the multi-stage hydrogenation process just described results not only in a high degree of hydrogenation of the subject block copolymers but also does so in the virtual absence of any deleterious polymer degradation, as determined by GPC. This is of especial importance with respect to block polymers as noted in the introductory sections of this specification.

An additional feature of the present invention comprises the finding that the same results cannot be obtained by introducing the catalyst modifier during the first mild hydrogenation step. The reason for this appears to be obscure but the comparative results reported in the following examples substantiates this conclusion. Moreover, it has been found that the presence of the catalyst modifiers in the first, i.e., diene hydrogenation step reduces the rate of hydrogenation in that step. While the presence of the modifier in the more stringent hydrogenation step actually causes an acceleration in the hydrogenation rate therein. These results would appear to be contrary to the results obtained in the hydrogenation of monomeric materials utilizing the same catalyst system. This difference in behavior relative to rates in each of the individual hydrogenation steps is evident even when hydrogenating block polymers which have been prepared by sequential process rather than by a coupling process. The benefits of the present invention therefore appear to apply not only to sequential products but more particularly to coupled products since a double benefit is especially evident in the later instance.

The following examples illustrate the process of the present invention.

EXAMPLE I

The block copolymer employed for this example was one having the formula polystyrene-polyisoprene-polystyrene with block molecular weights of approximately 15,000-70,000-15,000. The polymer was formed by solution polymerization utilizing secondary butyl lithium as the initiator, initially polymerizing styrene and block polymerizing isoprene thereon to form a living intermediate block copolymer which was coupled with ethyl acetate to form the above three-block polymer.

The hydrogenation catalyst was prepared by reacting nickelous acetyl acetonate with aluminum triisobutyl at 25° C. of 15 minutes under 100 p.s.i.g. hydrogen pressure in cyclohexane solution. The coupled block copolymer was then added to the hydrogenation catalyst and mild hydrogenation of the isoprene polymer block was conducted at 750 p.s.i.g. pressure at 40° C. for 90 minutes, the product at this stage having an iodine number of 5. At this point isopropyl alcohol was injected to modify the catalyst, the hydrogenation temperature was raised to 200° C. and the pressure was increased to 1200 p.s.i.g. After one hour of hydrogenation analysis indicated that the polystyrene blocks were substantially completely hydrogenated.

GPC examination of the completely hydrogenated polymer showed that no significant molecular weight degradation had occurred. In the above hydrogenation process, the catalyst formed was a ratio of 0.49 mmole nickel acetyl acetonate to 1.3 mmoles aluminum triisobutyl, the weight ratio block polymer:nickel being 1600. The isopropyl alcohol was employed in amount of 1.8 moles per mole of aluminum and the block polymer was present as a 5.7 weight percent concentration in cyclohexane. The block polymer contained approximately 29.4 weight percent of polystyrene prior to hydrogenation according to UV analysis.

The following table shows the results obtained by the use of other hydrogenation conditions not meeting the sequence called for by process of this invention.

TABLE I

| IPA addition | Other conditions | Polystyrene content after 30 minutes, percent weight | Molecular weight degradation, GPC |
|---|---|---|---|
| (1) As above | As above | 0 | None. |
| (2) No IPA | do | 25 | Extensive. |
| (3) IPA mixed with feed. | Heated SIS directly to 200° C. | 14 | Do. |
| (4) No IPA | do | 5 | Do. |
| (5) do | Heated SIS directly to 225° C. | 18 | Very extensive. |

It will be noted from the above table that when an isopropyl alcohol (IPA) was utilized polystyrene hydrogenation was then complete under the conditions employed and extensive molecular weight degradation had occurred. If isopropyl alcohol was mixed with the initial feed and was present during both stages of the hydrogenation, again polystyrene hydrogenation was incomplete and molecular weight degradation was extensive.

EXAMPLE II

Samples corresponding to Samples (4) and (1) of Table I above were prepared using a nickel octoate-aluminum triethyl hydrogenation catalyst. Again it was found that the use of low temperatures (70° C.) for hydrogenation of the aliphatic double bonds followed by isopropyl alcohol addition and hydrogenation of the aromatic double bonds at 200–220° C. resulted in substantially no degradation of the product. However, when using the conditions of Sample (4), extensive degradation occurred.

I claim as my invention:

1. In the process for the hydrogenation of block copolymers comprising conjugated diene polymer blocks and monovinyl arene polymer blocks wherein the block copolymer is hydrogenated in solution utilizing a catalyst consisting essentially of the reaction product of an aluminum alkyl compound and a transition metal salt of the group consisting of carboxylates, halides and alkoxides of nickel and cobalt the molar ratio of aluminum to transition metal being between about 1:1 and 10:1, the improvement comprising, (a) hydrogenating the block copolymer at temperatures below about 125° C., at pressures below about 1,000 p.s.i.g. and in the substantial absence of catalyst modifiers;

(b) conducting hydrogenation until at least about 90% of the aliphatic unsaturation is reduced and no more than a minor amount of aromatic unsaturation has been reduced;

(c) adding to the hydrogenation reaction mixture a catalyst modifier of the group consisting of ethers, amines, alcohols, and oxygen, the molar ratio of modifier to aluminum being between about 1:1 and 10:1;

(d) and continuing hydrogenation at temperatures between about 100° C. and 250° C. under at least 1,000 p.s.i.g. pressure until at least about 40% of the aromatic unsaturation has been reduced.

2. A process according to claim 1 wherein the block copolymer is a coupled copolymer.

3. A process according to claim 2 wherein the copolymer is coupled with an ester of a carboxylic acid.

4. A process according to claim 2 wherein the modifier is an alcohol.

5. A process according to claim 4 wherein the alcohol is isopropyl alcohol.

6. A process according to claim 1 comprising
(a) hydrogenating a block copolymer comprising a diester-coupled block copolymer of styrene and isoprene in cyclohexane solution at 30–60° C. under 600–800 p.s.i.g. pressure whereby at least about 90% of the original aliphatic unsaturation is reduced, the hydrogenation catalyst being the reaction product of nickel acetyl acetonate and aluminum triisobutyl;
(b) modifying the catalyst by the addition of 1.5–2.5 moles isopropyl alcohol per mole of aluminum; and
(c) hydrogenating the modified reaction mixture at 175–225° C. under 1100–2000 p.s.i.g. pressure until at least about 75% of the aromatic unsaturation has been reduced.

References Cited

UNITED STATES PATENTS

| | | | |
|---|---|---|---|
| 2,864,809 | 12/1958 | Jones et al. | 260—94.7 |
| 3,113,986 | 12/1963 | Breslow et al. | 260—94.7 |
| 3,205,278 | 9/1965 | Lapporte | 260—94.7 |
| 3,333,024 | 7/1967 | Haefele et al. | 260—880 |
| 3,465,063 | 9/1969 | Hassell | 260—94.7 |

JAMES A. SEIDLECK, Primary Examiner

U.S. Cl. X.R.

260—85.1, 880 B